United States Patent [19]

Sugawara

[11] Patent Number: 5,313,456
[45] Date of Patent: May 17, 1994

[54] DATA LINK PROTECTING SYSTEM
[75] Inventor: Eiji Sugawara, Yokohama, Japan
[73] Assignee: Fujitsu Limited, Kawasaki, Japan
[21] Appl. No.: 860,118
[22] Filed: Mar. 31, 1992

Related U.S. Application Data

[63] Continuation of Ser. No. 488,217, Mar. 5, 1990, abandoned.

[30] Foreign Application Priority Data

Mar. 3, 1989 [JP] Japan .................. 1-051398

[51] Int. Cl.⁵ .............................. H04J 1/16
[52] U.S. Cl. ...................... 370/16; 371/11.1; 340/827
[58] Field of Search ............ 370/16, 110.1, 112, 370/13; 371/16, 28.1, 8.2, 8.3, 11.2, 11.1; 340/827, 825.01, 825.03

[56] References Cited

U.S. PATENT DOCUMENTS

| | | | |
|---|---|---|---|
| 4,380,810 | 4/1983 | Canniff | 370/56 |
| 4,680,776 | 7/1987 | Ikeuchi et al. | 375/40 |
| 4,700,348 | 10/1987 | Ise et al. | 370/16 |
| 4,727,541 | 2/1988 | Mori et al. | 370/110.1 |
| 4,831,617 | 5/1989 | Iwasaki | 370/16 |
| 4,864.568 | 9/1989 | Sato et al. | 370/825.01 |
| 4,967,406 | 10/1990 | Yagi et al. | 370/16 |
| 5,010,550 | 4/1991 | Hirata | 370/16 |
| 5,014,264 | 5/1991 | Nagler et al. | 370/16 |
| 5,069,521 | 12/1991 | Hardwick | 370/16 |
| 5,109,296 | 4/1992 | Fukushima et al. | 370/16 |

Primary Examiner—Douglas W. Olms
Assistant Examiner—Dang Ton
Attorney, Agent, or Firm—Staas & Halsey

[57] ABSTRACT

A line interface circuit on the receiving side detects communication failure in terms of an error rate and informs the supervisory and control unit on the receiving side of the occurrence of the failure. The supervisory and control unit on the receiving side in turn switches the line data communications from the receiving side to the transmitting side to another line unused for data communications to inform the supervisory and control unit on the transmitting side of the occurrence of the failure. The supervisory and control unit on the transmitting side switches the line for data communications from the transmitting side to the receiving side to the other line. The switching circuit on the receiving side comprises buffers each inserted in a line and a buffer connected to the common outputs of the buffers so that the supervisory and control unit on the receiving side automatically receives a transmit signal transmitted over a line switched on the transmitting side.

6 Claims, 7 Drawing Sheets

DATA LINK PROTECTING SYSTEM

This application is a continuation of application Ser. No. 07/488,217, filed Mar. 5, 1990, now abandoned.

BACKGROUND OF THE INVENTION

The present invention relates to a protecting system for protecting a data link used for transmission of data between supervisory and control units of transmission devices.

BACKGROUND ART

With the recent expansion of data transmission networks, control and supervision from locations which are distant from transmission devices, such as centralized supervision and remote control, have been required. A data link communication system is a system which allows communication of data at a low speed. This system uses service bits contained in a main signal to control and supervise an opposed device and is now widely used. In the event of an interruption of the main signal and degradation in error rate causing failure of the main signal, however, data link communication is impossible. Therefore, the data link must be protected.

Figure 1:
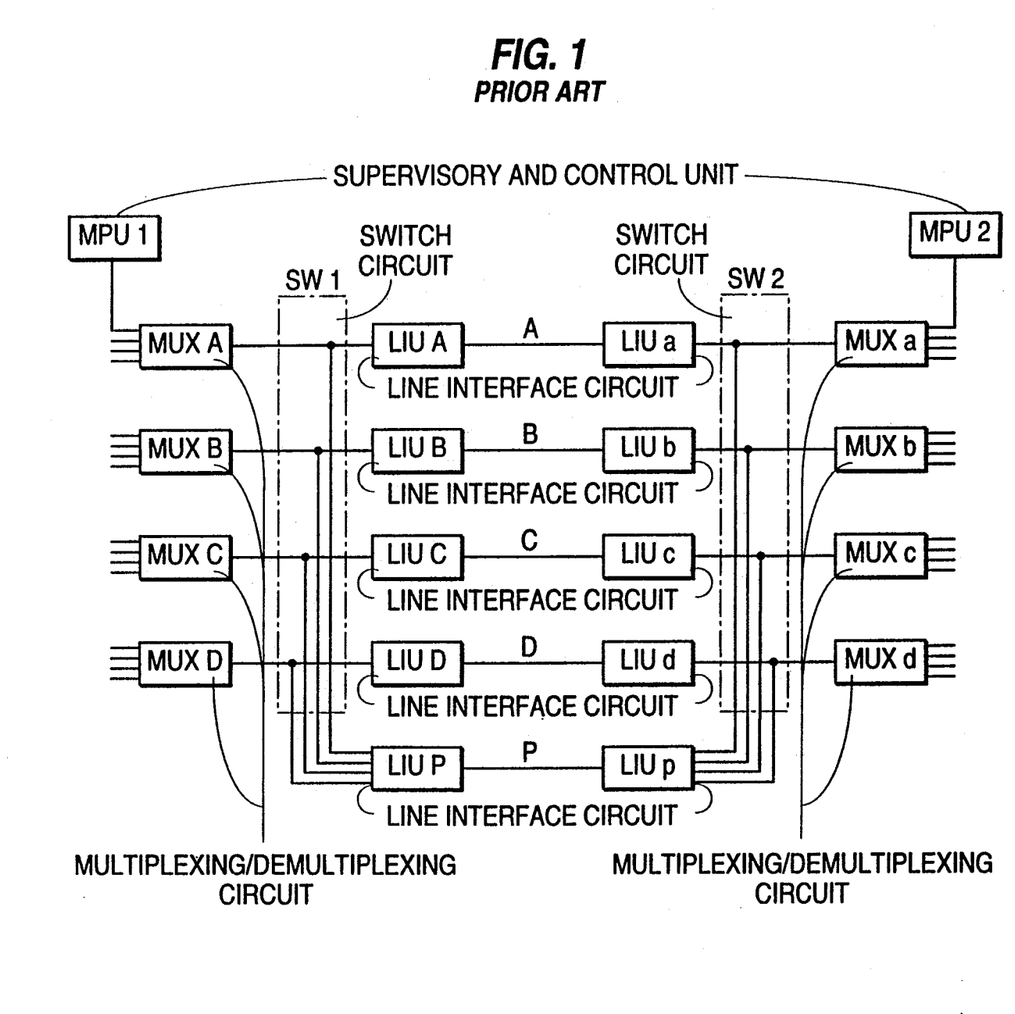
FIG. 1 is a block diagram of a conventional data link protecting system.

FIG. 1 illustrates a conventional data link protecting system. A through D designate normal lines and P designates a backup line. LIUA through LIUD and LIUa through LIUd denote line interface circuits having functions of communicating with opposed devices, detecting the error rate of received signals, detecting abnormalities in main signals, such as signal interruption, and feeding intermediate repeaters. MUXA through MUXD and MUXa through MUXd designate multiplexing/demultiplexing circuits, and SW1 and SW2 denote switch circuits adapted to switch an abnormal line to the backup line. MPU1 and MPU2 denote supervisory and control units which control their associated devices, supervise the line interface circuits LIUs to switch the switch circuits SW as needed and perform data link communication with opposed devices. Note that the FIG. 1 illustrates only the arrangement for data transmission in one direction. The arrangement for data transmission in the opposite direction is the same as above.

In the case of PCM 24, to each of the multiplexing/demultiplexing circuits MUX 24 channels operating at 64 KHz are connected and multiplexed at 1.544 Mb/s for transmission. They are demultiplexed at the receiving end. With PCM 30, on the other hand, 30 channels operating at 64 KHz are connected and multiplexed at 2.048 Mb/s.

A data link signal from supervisory and control unit MPU1 is coupled to multiplexing circuit MUXA for transmission to the opposed device over line A. In the opposed device, demultiplexing circuit MUXa derives the data link signal and transmits it to supervisory and control unit MPU2. A signal transmitted at 2.048 Mb/s includes spare bits. The data link signal is transmitted by the use of the spare bits. In case where a failure occurs in the line A, the switch circuits SW are switched under the control of the unit MPU so that the multiplexing/demultiplexing circuits MUXA and MUXa are connected to the line interface circuits LIUP and LIUp, thereby protecting the data link.

The switches SW also switch the main signal from the line A to the backup line P. The line B, C or D is also switched to the backup line P when it is faulty. However, the line A adapted to transmit the data link signal is assigned the highest priority so that even when the line B, C or D is faulty, the line A is switched to the line P with first priority if it is faulty.

The problems with the conventional system are that a backup line is necessarily required, the line A has priority over the other lines in switching to the backup line and the data link communication becomes impossible when failures occur in both the lines A and P.

SUMMARY OF THE INVENTION

It is accordingly an object of the present invention to provide a data link protecting system which permits protection of a data link without a backup line and permits data communications without fail if there is a line that can be used for communication.

A protecting system for a data link providing low-speed data communications between supervisory and control units (MPUs) of opposed transmission equipment units utilizes service bits for control and supervision of the transmission equipment units. The protecting system comprises switching circuits for connecting the supervisory and control units to an arbitrary one of multiplexing/demultiplexing circuits provided for respective communication lines between the transmission equipment units, over which signals multiplexed by the multiplexing/demultiplexing circuits are transmitted, in order to protect the data link when a failure occurs in a line which is in use for data communications and line interface circuits connected between the multiplexing/demultiplexing circuits and the lines for informing the supervisory and control units of the occurrence of the failure when detecting the failure to thereby cause the switching circuits to perform the switching operation. A line interface circuit on the receiving side detects the failure in terms of an error rate and informs the supervisory and control unit on the receiving side of the occurrence of the failure. The supervisory and control unit on the receiving side in turn switches the line data communications from the receiving side to the transmitting side to another line unused for data communications to inform the supervisory and control unit of the occurrence of the failure. The supervisory and control unit on the transmitting side switches the line for data communications from the transmitting side to the receiving side to another line. The switching circuit on the receiving side comprises buffers each inserted in a line and a buffer connected to the common outputs of the buffers so that the supervisory and control unit on the receiving side automatically receives a transmit signal transmitted over a line switched on the transmitting side.

BRIEF DESCRIPTION OF THE DRAWINGS

The present invention will be described with reference to the accompanying drawings, wherein.

DETAILED DESCRIPTION OF THE INVENTION

Figure 2:
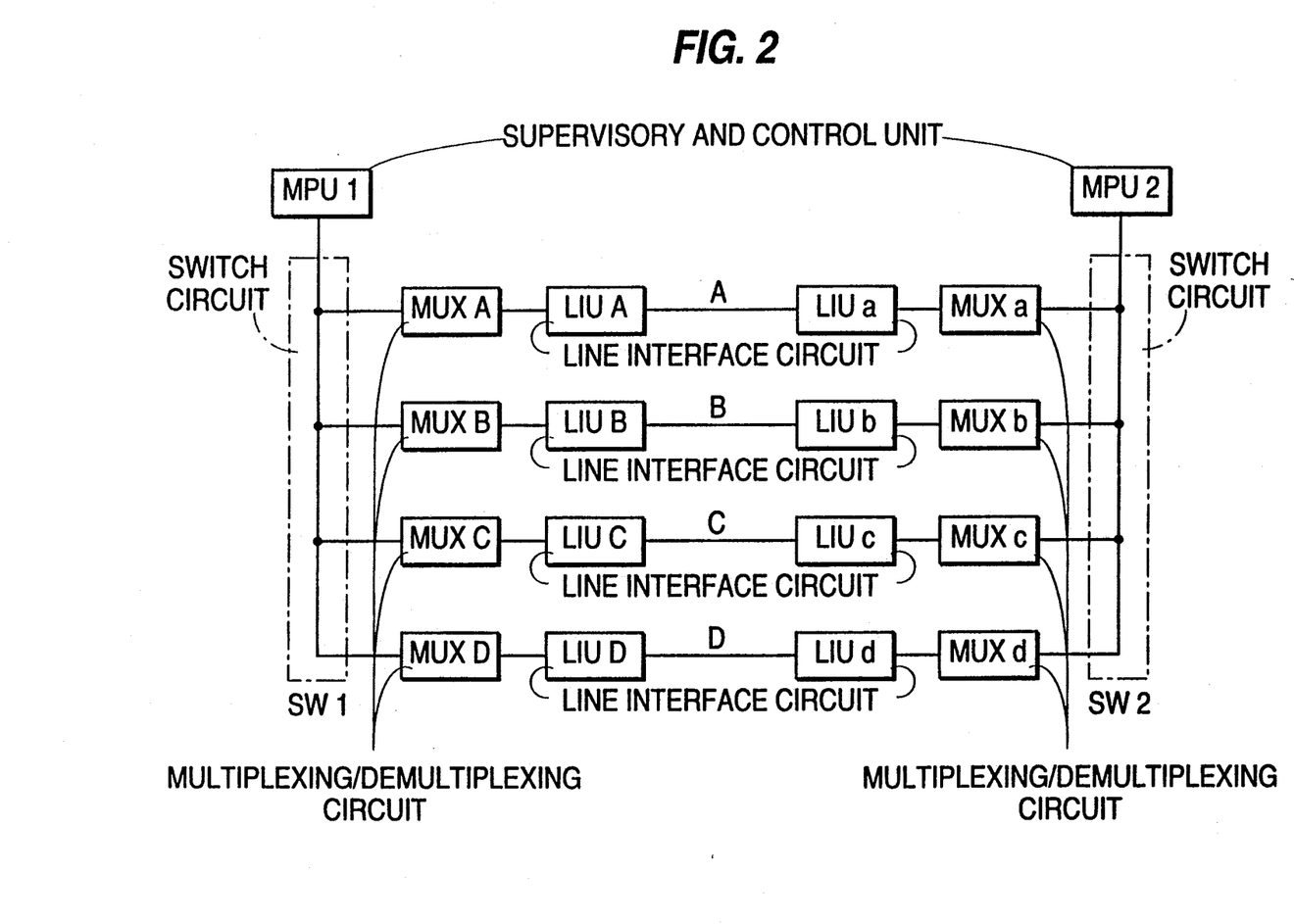
FIG. 2 is a block diagram for explaining the principle of the present invention.

FIG. 2 is a schematic block diagram illustrating the principle of the present invention. As illustrated, according to the present invention, switch circuits SW1 and SW2 are provided which selectively connect supervisory and control units MPU1 and MPU2 to corresponding ones of multiplexing/demultiplexing circuits MUXA to MUXD and MUXa to MUXd. A backup line P is not provided.

Like reference numerals designate like or corresponding parts throughout all the views. Thus, the multiplexing/demultiplexing circuits MUX and line interface circuits LIU are the same as those of FIG. 1.

When the supervisory and control unit MPU1 operates the switch circuit SW1 to connect MPU1 to MUXA, data link communication is effected between the supervisory and control units MPU1 and MPU2 over the line A.

When a failure of the line A is detected, the data link communication is switched from the line A to another, for example, the line B. This switching is made as follows. That is, a line failure is usually detected as a failure in reception. When detecting the line failure in terms of error rate by way of example, the line interface circuit LIUa on the receiving side informs the supervisory and control unit MPU2 via MUXa of the detection of the line failure. Upon being informed of the line failure, MPU2 informs MPU1 of the failure of the line A via another line, for example, another line of B directed from MPU2 to MPU1 not shown. Responsive to this, the supervisory and control unit MPU1 switches switch circuit SW1 to connect MPU1 to another line, for example, the line B. Thereby, the data link communication becomes effected over the line B.

If a failure should also occur in the line B, the line switching will be made likewise. The line B is thus switched to another line, for example, the line C. In FIG. 1, if the line A is faulty, it is switched to the backup line P and, if the backup line P is also faulty, the data link communication will be interrupted. According to the present invention, as long as there are normal lines, data link communications can be continued. No backup is needed. However, if a failure occurs in a line, the transmission of a main signal over the line is interrupted.

Figure 3:
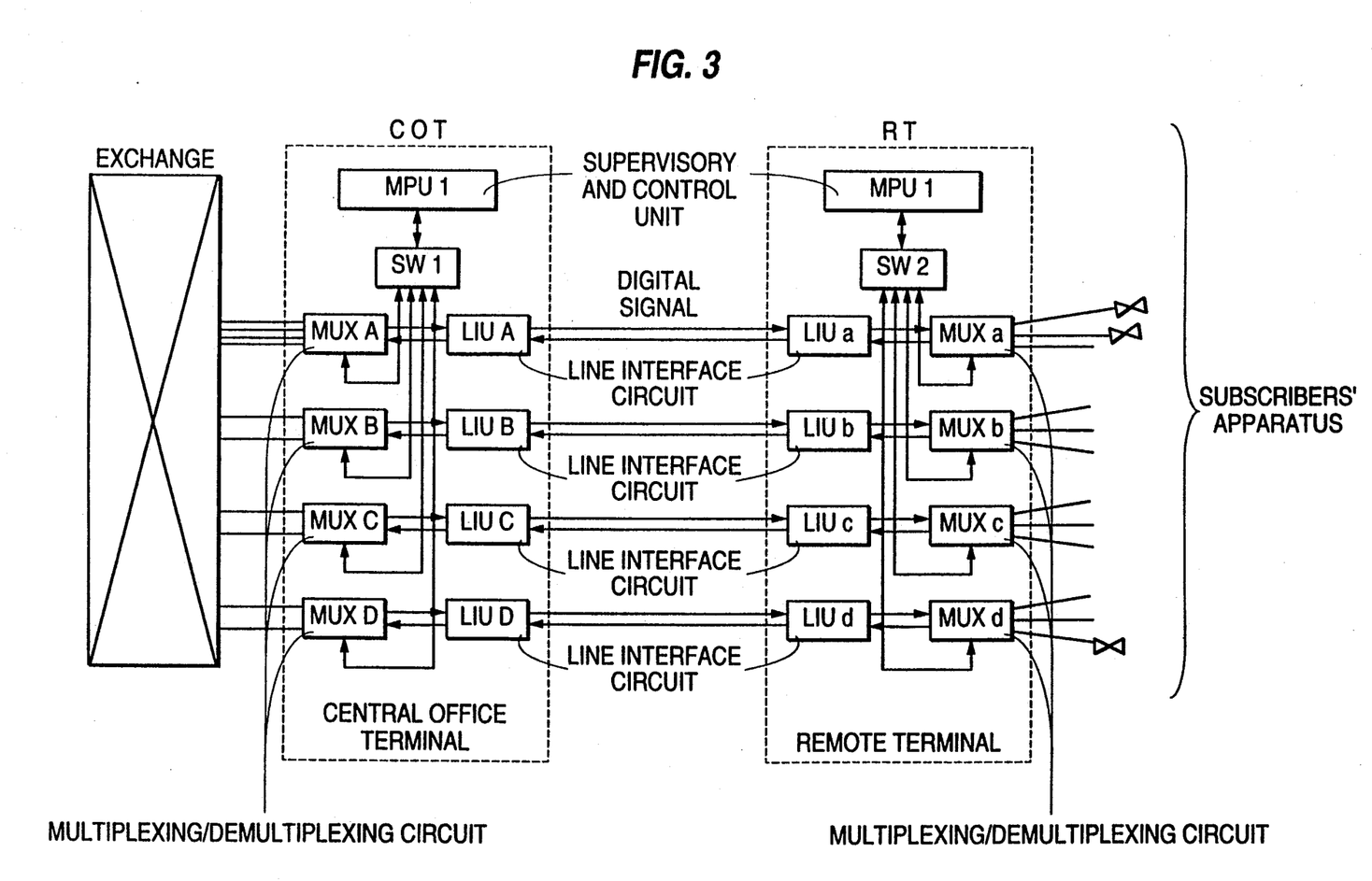
FIG. 3 is a block diagram of a telephone exchanging system using the data link protecting system of the present invention.

FIG. 3 illustrates an example of a telephone exchanging system using a data link protecting system of the present invention. In FIG. 3, COT designates a central office terminal which is installed on the side of a telephone exchange. RT designates a remote terminal which is installed at a remote location and connected to a large number of subscribers' terminals. MPU1 and MPU2 are supervisory and control units which are installed within the COT and RT, respectively. In FIG. 3, there are shown pairs of lines for transmission of multiplexed digital signals between the COT and the RT.

In FIG. 3, the central office terminal COT, which is connected to the exchange, multiplexes subscribers' signals, such as voice signals and 64 KPCM data, from the exchange to send them over lines in the direction of the remote terminal RT and demultiplexes signals from the remote terminal RT for connection to the exchange.

The remote terminal RT is installed at a place where subscribers' terminals are scattered and the number of subscribers' lines are not so many as an exchange requires installing and is adapted to connect the subscribers' terminals to the exchange. Thus, there is a great possibility that the remote terminal RT is installed in an unattended station. When installed in an unattended station, the remote terminal RT requires to be controlled and supervised by the central office terminal COT installed in a manned office on a remote control basis.

Figure 4:
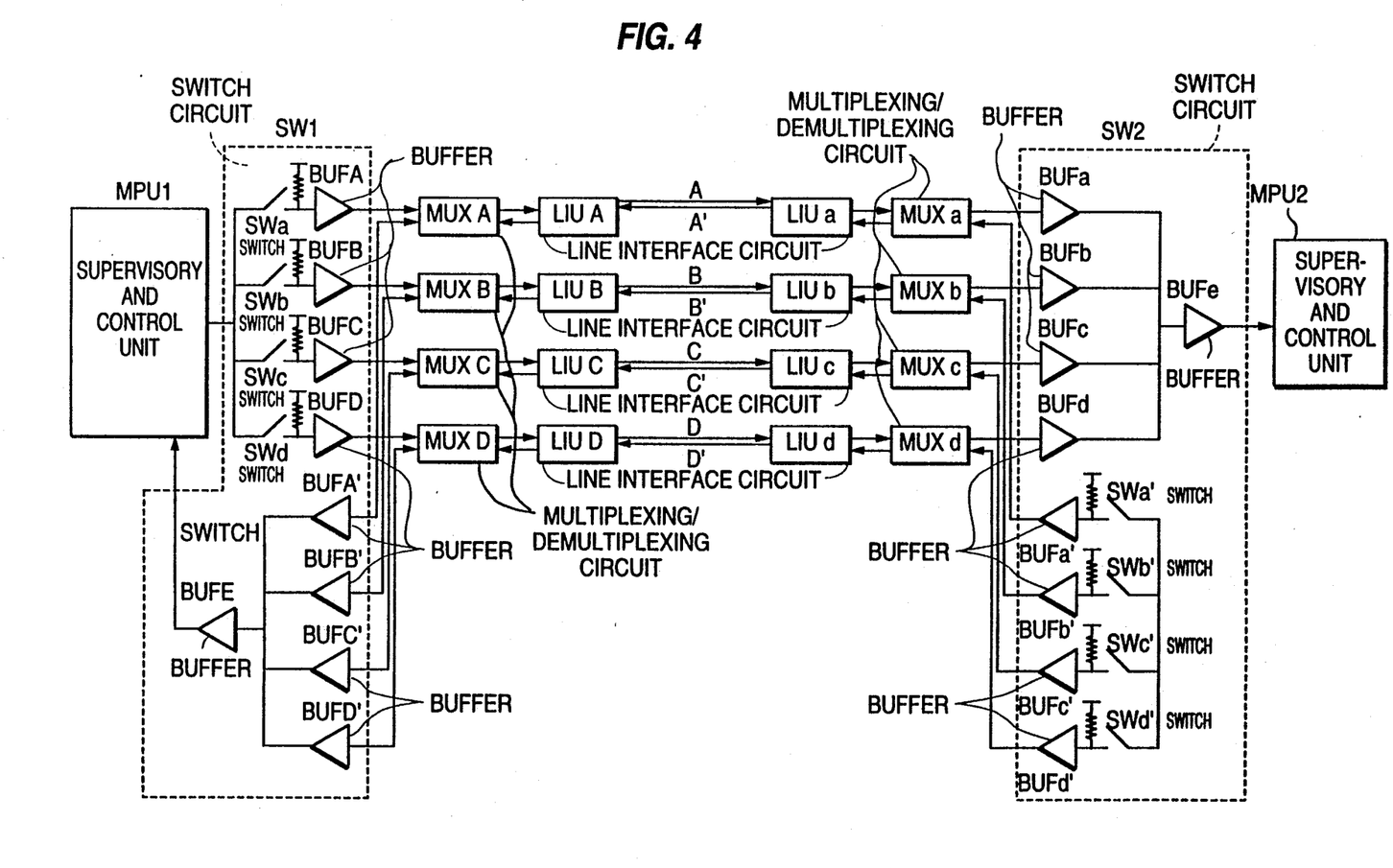
FIG. 4 is a block diagram illustrating an embodiment of the data link protecting system of the present invention.

FIG. 4 illustrates an embodiment of a data link protecting system of the present invention. In FIG. 4, the arrangements of the switch circuits SW1 and SW2 of FIG. 2 are illustrated in detail and lines adapted for data transmission in the opposite directions are shown.

In FIG. 4, the switch circuit SW1 for the unit MPU1 includes switches SWa to SWd and buffers BUFA to BUFD which are inserted in corresponding transmission lines. The input terminals of the buffers are pulled up to a H (high) level potential through resistors. The switch circuit SW2 at the receiving end includes buffers BUFa to BUFd inserted in corresponding lines and a buffer BUFe connected in common to output terminals of the buffers BUFa to BUFd.

The switches SWa to SWd are turned on and off under the control of the supervisory and control unit MPU1. The buffers BUFa to BUFd have open-collector outputs. Data link signals from supervisory and control units MPU are in a general format.

Assuming now that the unit MPU1 closes the switch SWa and opens the switches SWb to SWd, the line B to D (specifically the spare bits) are placed at a H (high) level and the line A is rendered H and L (low) in accordance with a data link signal. Since the output terminals of the buffers BUFa to BUFd are wired-ORed, the data link signal on the line A is taken at the output terminals and sent to the unit MPU2 via the buffer BUFe.

When a failure occurs in the line A, the unit MPU1 switches the switch circuit SW1 as described above. For example, when the switch SWa is opened and the switch SWb is closed, the lines A, C and D are placed at a H level, while the line B is rendered H and L in accordance with the data link signal. Since the buffers BUFa to BUFd are wired-ORed at their outputs, the signal on the line B is obtained at their outputs which, in turn, is fed to the unit MPU2 via the buffer BUFe. This also applies correspondingly to a case where a failure occurs in the line B, C or D. In this way the switching of the data link lines is made. Of the switch circuits, the switch circuit SW1 on the transmitting side has the switches SWa to SWd which are turned on and off for line switching, while the switch circuit SW2 on the receiving side has no switch but effects automatic switching of a transmitted signal by means of the wired-OR connection of the outputs of the buffers BUFa to BUFd.

Figure 5:
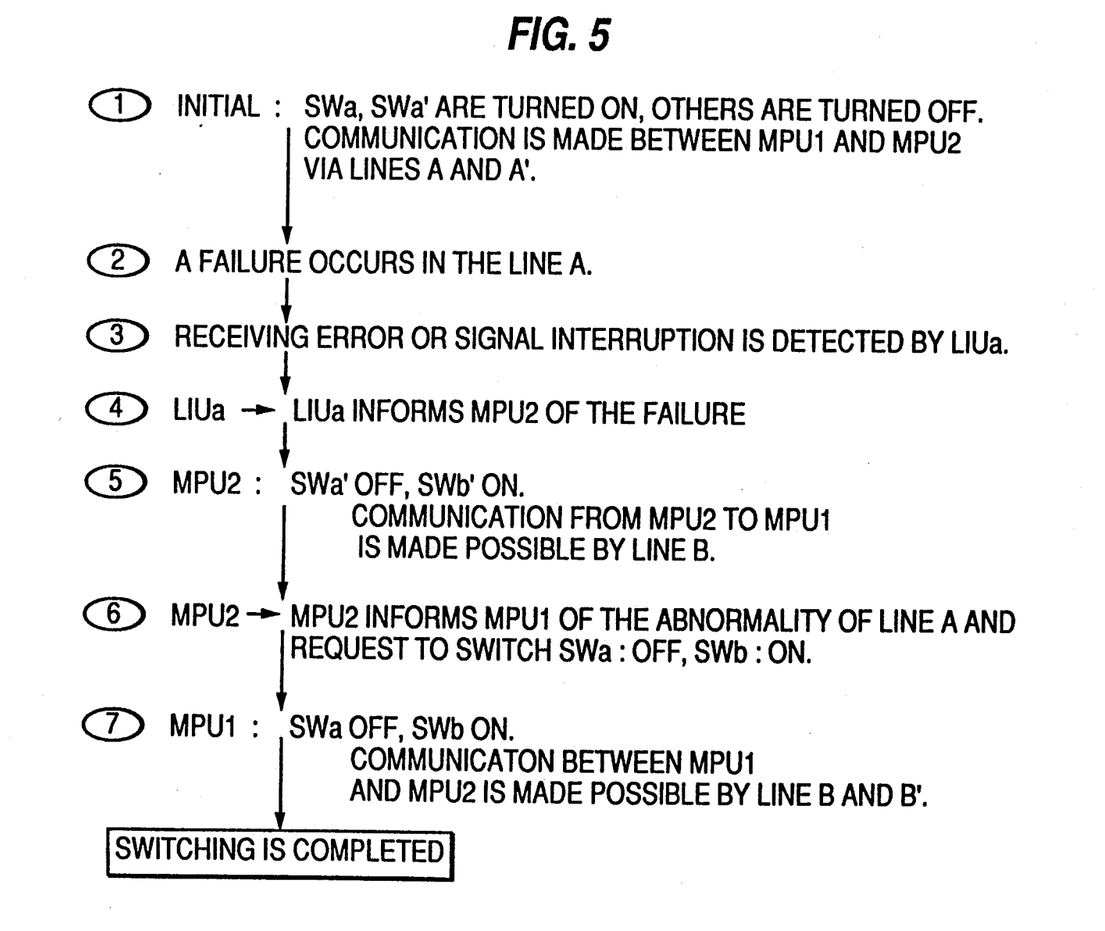
FIG. 5 illustrates a procedure which is performed when a data link failure occurs.

FIG. 5 illustrates the flow of a process when a data link failure occurs. Assume that, in an initial step ①, the switch SWa for the line A in the switch circuit SW1 and a transmission switch SWa' in the switch circuit SW2 are both closed so that communication is made between the units MPU1 and MPU2 via the lines A and A'. When a failure occurs in the line A in step ②, the failure is detected by the interface circuit LIUa as a receiving error or a signal interruption in step ③. The unit MPU2 is informed of the failure in step ④.

The unit MPU2 opens the transmission switch SWa' and closes a switch SWb' in the switch circuit SW2 in step ⑤. As a result, the communication from the unit MPU2 to the unit MPU1 is made possible by the use of the line B'. In step ⑥, the unit MPU2 informs the unit MPU1 of the abnormality of the line A and sends to it a request to switch the switch SWa off and the switch SWb on. Responsive to this request, the unit MPU1 turns the switch SWa off and the switch SWb on in step ⑦. Thereby, the communication is made possible by the use of the lines B and B'.

Figure 6:
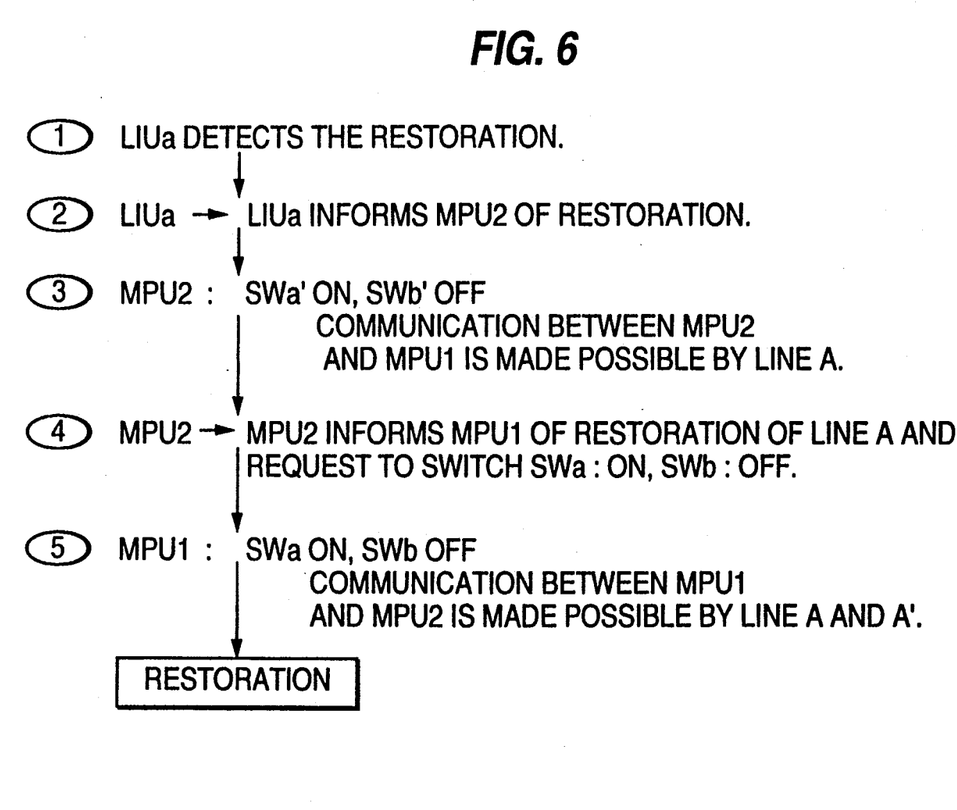
FIG. 6 illustrates a procedure which is performed when the data link is restored.

FIG. 6 illustrates the flow of a process which is performed when the data link is restored. When the interface circuit LIUa on the side of the unit MPU2 detects the restoration of the line A in step ①, the unit MPU2 is informed of the fact in step ②. Thus, the unit MPU2 turns the switch SWa' on and the switch SWb' off in step ③, thereby allowing communication via the line A. The unit MPU2 informs the MPU1 of the restoration of the line A and sends to it a request to switch the switch SWa on and the switch SWb off in step ④. Then the unit MPU1 turns the switch SWA on and the switch SWb off in step ⑤, thus permitting the communication via the lines A and A' again and completing the restoration.

Figure 7:
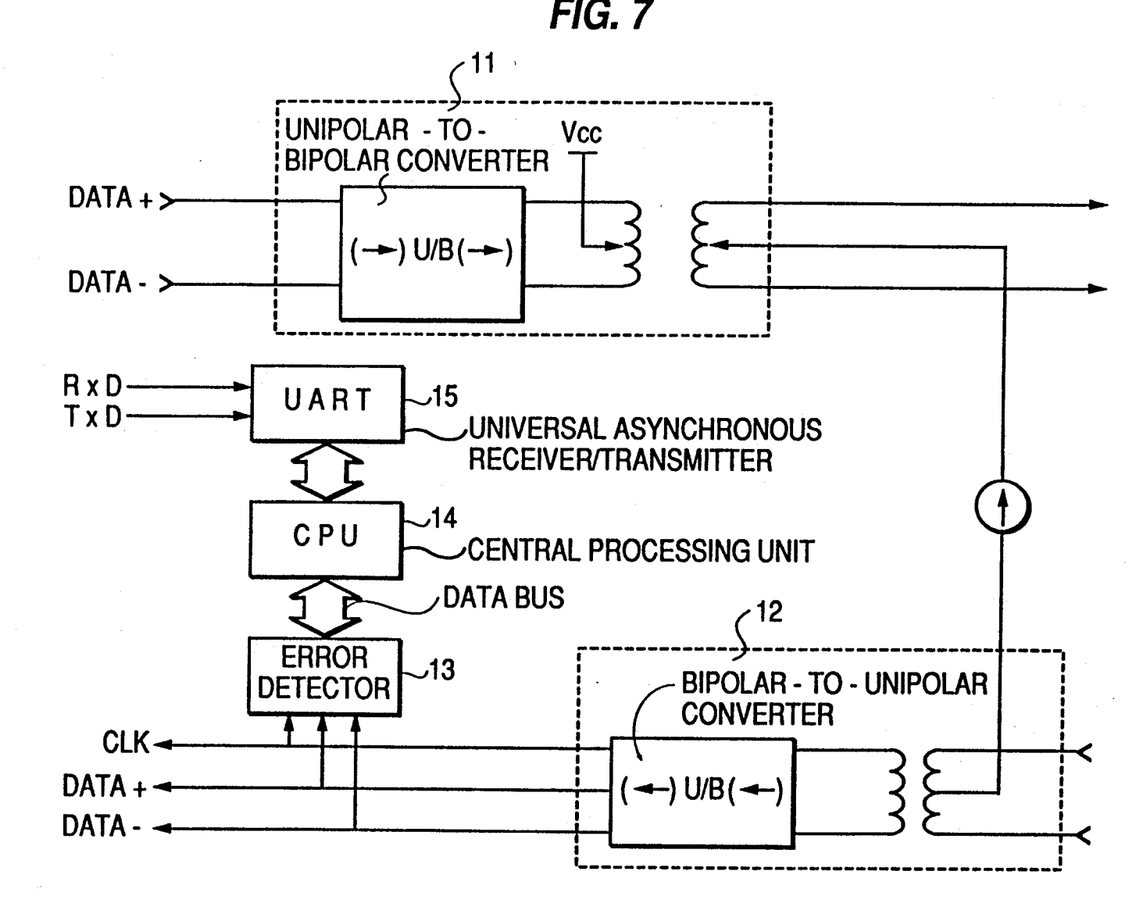
FIG. 7 is a block diagram of the line interface circuit.

FIG. 7 is a block diagram of an example of the line interface circuit. The line interface circuit comprises a unipolar-to-bipolar converter 11 for converting a unipolar signal to a bipolar signal for transmission over a line, a bipolar-to-unipolar converter 12 for converting a bipolar signal sent over a line to a unipolar signal, i.e., data and clocks, an error detector 13 for monitoring a received unipolar signal so as to detect an error in it, a CPU 14 for collecting data from the error detector 13 and a universal asynchronous receiver transmitter UART 15 for allowing communication between the CPU 14 and the supervisory and control unit MPU. The universal asynchronous receiver/transmitter UART 15 sends transmit data T×D to the supervisory and control unit MPU. Receive data R×D is applied from the unit MPU to the receiver transmitter UART 15. The universal asynchronous receiver/transmitter UART is commercially available as an asynchronous serial transmission LSI.

As described above, the data link protecting system is useful for control and supervision at a location distant from a transmission device, that is, centralized supervision and remote supervision.

What is claimed is:

1. A data link protecting system for a data link providing communication between supervisory and control units using communication lines, supervised by the supervisory and control units, which transmit main data signals between terminals using multiplexing by multiplexing/demultiplexing circuits, each having unmultiplexed ports operatively connected to the terminals and a multiplexed port operatively connected to one of the communication lines, said data link protecting system comprising:
   buffering means connected to a first unmultiplexed port of one of the multiplexing/demultiplexing circuits on a transmit side of the communication lines;
   switching means for selectively connecting each of the supervisory and control units to said buffering means;
   automatic supervisory and control signal means, each connected to a second unmultiplexed port of each of the multiplexing/demultiplexing circuits on a receiving side of the communication lines and to one of the supervisory and control units, for supplying all signals output from the second unmultiplexed port of all of the multiplexing/demultiplexing circuits connected thereto to the one of the supervisory and control units connected thereto;
   line interface units connected between the communication lines and the multiplexing/demultiplexing circuits for detecting a failure in a communication line and informing the supervisory and control units of the failure; and
   means for controlling the supervisory and control units to switch two of the unmultiplexed ports of different multiplexing/demultiplexing circuits using said switching means to continue data link communication via another communication line.

2. The data link protecting system according to claim 1, wherein the unmultiplexed ports of the multiplexing/demultiplexing circuits connected to the one of the supervisory and control units are connected to an exchange and the unmultiplexed ports of the multiplexing/demultiplexing circuits connected to the other of the supervisory and control units are connected to a plurality of subscribers' terminals.

3. The data link protecting system according to claim 1,
   wherein said buffering means includes on the transmit side of the communication lines:
      a transmit buffer connected to each of the communication lines, said transmit buffer having an input;
      means for pulling the input of each buffer up to a high level potential,
   wherein said switching means includes a switch connected to said buffering means and the supervisory and control units, and
   wherein said automatic supervisory and control signal means comprises:
      initial receive buffers, each having an input terminal connected to the second unmultiplexed port of one of the multiplexing/demultiplexing circuits on the receive side and having an output terminal; and
      a final receive buffer, having input terminals connected to the output terminal of all of said initial receive buffers and an output terminal connected to the one of the supervisory and control units, to provide automatic supply of the signals from the second unmultiplexed port of each of the multiplexing/demultiplexing circuits on the receive side.

4. The data link protecting system according to claim 1,
   wherein each of said line interface units comprises:
      unipolar to bipolar converting means for converting a transmit signal from a unipolar signal to a bipolar signal;
      bipolar to unipolar converting means for converting a receive signal from a bipolar signal to a unipolar signal;
      error detecting means for detecting an error in the receive signal on the basis of an output signal of said bipolar to unipolar converting means;
      a processor responsive to said error detecting means for detecting a failure in a communication line; and a universal asynchronous receiver/transmitter for communication between said processor and one of the supervisory and control units, and wherein the one of the supervisory and control units collects information of the failure through said universal asynchronous receiver/transmitter using a polling method and serial communication.

5. A method of protecting a data link providing communication between supervisory and control units using communication lines, supervised by the supervisory control units, which transmit main data signals between terminal units using multiplexing by multiplexing/demultiplexing circuits, said method of protecting the data link comprising the steps of:

(a) detecting, in a line interface unit, a failure of a first communication line available for transmission of the main data signals and in use for data link communication from a transmitting side to a receiving side;

(b) informing a supervisory and control unit on the receiving side of the failure detected by the line interface unit on the receiving side;

(c) switching a second communication line, corresponding to the first communication line, but in use for data link communication from the receiving side to the transmitting side, to a third communication line available for transmission of the main data and unused for data link communication from the receiving side to the transmitting side;

(d) informing a superfvisory and control unit on the transmitting side of the failure of the first communication line via the third communication line by the supervisory and control unit on the receiving side; and (e) switching to a fourth communication line available for transmission of the main data and unused for data link communication from the transmitting side to the receiving side by the supervisory and control unit on the transmitting side.

6. A method of protecting a data link providing communication between a supervisory and control unit on a transmitting side and a supervisory and control unit on a receiving side using communication lines which transmit main data signals between terminal units using multiplexing by multiplexing/demultiplexing circuits, said method of protecting the data link comprising the steps of:

(a) detecting, in a line interface unit on the receiving side, restoration of a first communication line in which a failure had occurred;

(b) informing the supervisory and control unit on the receiving side of said detecting of the restoration of the communication line by the line interface unit on the receiving side;

(c) switching a second communication line in use for data link communication from the receiving side to the transmitting side to a third communication line from the receiving side to the transmitting side, corresponding to the first communication line which has been restored;

(d) informing the supervisory and control unit on the transmitting side of the restoration of the first communication line via the third communication line by the supervisory and control unit on the receiving side; and (e) switching to the first communication line from the transmitting side to the receiving side by the supervisory and control unit on the transmitting side.

* * * * *

UNITED STATES PATENT AND TRADEMARK OFFICE
CERTIFICATE OF CORRECTION

PATENT NO. : 5,313,456
DATED : May 17, 1994
INVENTOR(S) : Eiji Sugawara

It is certified that error appears in the above-indentified patent and that said Letters Patent is hereby corrected as shown below:

Col. 1, line 42, delete first occurrence of "the";
line 46, after "multiplexing" delete "-"; and
line 62, after "multiplexing" delete "-".

Col. 2, line 30, after "multiplexing" delete "-".

Col. 4, line 55, delete "sidc" and substitute --side--.

Col. 5, line 35, after "receiver" insert --/--; and
line 41, after "receiver" insert --/--.

Col. 6, line 19, after "multiplexing" delete "-"; and
line 22, after "multiplexing" delete "-".

Col. 7, line 13, after "multiplexing" delete "-"; and
line 31, delete "superfvisory" and substitute --supervisory--.

UNITED STATES PATENT AND TRADEMARK OFFICE
CERTIFICATE OF CORRECTION

PATENT NO. : 5,313,456

DATED : May 17, 1994

INVENTOR(S) : Eiji Sugawara

It is certified that error appears in the above-indentified patent and that said Letters Patent is hereby corrected as shown below:

Col. 7, line 13, after "multiplexing" delete "-"; and line 31, delete "superfvisory" and substitute --supervisory--.

Signed and Sealed this

Thirteenth Day of September, 1994

Attest:

BRUCE LEHMAN

Attesting Officer

Commissioner of Patents and Trademarks